US011615359B2

(12) United States Patent
Chaudhury et al.

(10) Patent No.: US 11,615,359 B2
(45) Date of Patent: Mar. 28, 2023

(54) CYCLE DETECTION TECHNIQUES

(71) Applicant: Drishti Technologies, Inc., Palo Alto, CA (US)

(72) Inventors: Krishnendu Chaudhury, Saratoga, CA (US); Ananya Honnedevasthana Ashok, Bangalore (IN); Sujay Narumanchi, Bangalore (IN); Devashish Shankar, Gwalior (IN); Ritesh Jain, Bangalore (IN)

(73) Assignee: Drishti Technologies, Inc., Palo Alto, CA (US)

(*) Notice: Subject to any disclaimer, the term of this patent is extended or adjusted under 35 U.S.C. 154(b) by 0 days.

(21) Appl. No.: 17/711,624

(22) Filed: Apr. 1, 2022

(65) Prior Publication Data

US 2022/0222939 A1 Jul. 14, 2022

Related U.S. Application Data

(62) Division of application No. 16/656,454, filed on Oct. 17, 2019, now Pat. No. 11,321,944.

(51) Int. Cl.
G06K 9/00 (2022.01)
G06Q 10/0633 (2023.01)
G06F 3/03 (2006.01)
G06V 20/40 (2022.01)
G06V 20/52 (2022.01)
G06F 3/01 (2006.01)

(52) U.S. Cl.
CPC ....... G06Q 10/0633 (2013.01); G06F 3/0304 (2013.01); G06V 20/40 (2022.01); G06V 20/52 (2022.01); G06F 3/011 (2013.01)

(58) Field of Classification Search
CPC .................................................. G06Q 10/0633
See application file for complete search history.

(56) References Cited

U.S. PATENT DOCUMENTS

| 10,110,858 | B2* | 10/2018 | Loce ..................... H04N 7/183 |
| 2012/0046044 | A1* | 2/2012 | Jamtgaard ........... G01S 5/02585 |
| | | | 455/456.1 |
| 2014/0080428 | A1* | 3/2014 | Rhoads .................. H04W 4/70 |
| | | | 455/88 |
| 2016/0361041 | A1* | 12/2016 | Barsimantov ......... A61B 8/065 |
| 2017/0017857 | A1* | 1/2017 | Wolf ..................... G06V 20/41 |
| 2017/0206669 | A1* | 7/2017 | Saleemi ................ G06T 11/206 |
| 2018/0218515 | A1* | 8/2018 | Terekhov ............... G06V 20/40 |

* cited by examiner

*Primary Examiner* — Hadi Akhavannik

(57) ABSTRACT

Techniques for detecting cycle data can include determining object properties and motion properties in a set of consecutive frames of a sensor stream. The cycle data can be determined from the object properties and motion properties without detecting constituent objects. The object properties and motion properties enable improved detection of cycle data in the presence of different object poses, different positions of the object, partial occlusion of the object, varying illumination, variation in the background, and or the like.

10 Claims, 9 Drawing Sheets

CYCLE DETECTION TECHNIQUES

CROSS-REFERENCE TO RELATED APPLICATIONS

This is a Divisional of U.S. patent application Ser. No. 16/656,454 filed Oct. 17, 2019, which is incorporated herein in its entirety.

BACKGROUND OF THE INVENTION

As the world's population continues to grow, the demand for goods and services continues to increase. Industries grow in lockstep with the increased demand and often require an ever-expanding network of enterprises employing various processes to accommodate the growing demand for goods and services. For example, an increased demand in automobiles can increase the need for robust assembly lines, capable of completing a larger number of processes in each station on the assembly line while minimizing anomalies and reducing completion times associate with each process. The collection of data is an important part of controlling, improving and or automating manufacturing and other similar contexts. A number of measurements are dependent upon detecting cycle start, cycle continue, cycle end and no cycle events of a given task or process.

Detecting cycle events from a sensor stream can be difficult. Furthermore, detecting the constituent parts that make up a cycle that are used to detect the cycle events can be very computationally intensive and may not be able to be performed at or faster than the rate of the manufacturing process. In addition, there can be considerable variation in the apperance of a unit within even a single cycle. There can be even bigger variations across cycles. Variations can be caused by pose differences, position differences, occlusion, disocclusion, illumination differences and the like. The pose of the object can be different within and across cycles because, for example, the object is usually pushed in by a human and may be oriented in many different ways when it enters view, especially in factories and/or workstations without a conveyor belt. The object can also change poses as the cycle progresses. The position of the unit can also be different within and across cycles. For instance, in factories and/or workstations without a conveyor belt, the object might appear anywhere in a considerable large area corresponding to the field of view of the video camera sensor. This can cause changes in the size of the object within the image frame owing to the varying distance from the camera. Similarly, workers standing or moving within the field of view or other transient objects may hide part of the unit from the camera in some frames and reveal the object in other frames. Variations in illumination can be caused by lighting that may vary at different points in time. In addition, there can be a lot of variation in the background. For example, variations can be cause by an indeterminate number of workers wearing clothing of various colors standing within the field of view of the cameras. In other examples, changes of furniture or settings in the background can also cause variations. Such variations can make it even more computationally intensive, and or increase the error rate in detecting cycle start, cycle continue, cycle end and no cycle events. Therefore, there is a continuing need for improved cycle detection techniques.

SUMMARY OF THE INVENTION

The present technology may best be understood by referring to the following description and accompanying drawings that are used to illustrate embodiments of the present technology directed toward cycle detection in manufacturing, health care, warehousing, shipping, retail, restaurant or similar contexts.

Typically, a manufacturing station or other similar context sees a small sequence of actions repeated again and again. For a given station, a cycle can be considered to be a sequence of actions that happen one after another and then get repeated. For instance, a computer assembling stations cycle may include bring in the computer case, affixing a motherboard to the computer case, affixing a hard drive to the computer case, connecting cables between the hard drive and the motherboard, affixing a fan to the computer case, affixing a power supply to the computer case, affixing a top cover to the computer case, affixing a label on the top cover, and the like. Detecting cycles and generating cycle data and rich statics therefrom can advantageously be utilized to identify bottleneck stations, under or over performing workers, determine product deliver plans, improve production efficiency, and or the like.

In one embodiment, a machine learning cycle detection method can include receiving a sensor stream including constituent objects of a plurality of cycles of a process. Object properties and motion properties in sets of frames of the sensor stream can be determined. One or more of a cycle start event, cycle continued event, cycle end event and or no cycle event can be determined automatically in real time based on the object properties and motion properties.

In another embodiment, a cycle detection system can include a set of light weight fully convolved layers, a concatenator, a fully connected neural network layer, a cycle event probability predictor module, a max probability finder and a connected component analyzer. The set of light weight fully convolved layers can be configured to receive a series of image sensor frames from a video and generate corresponding frames of descriptor vectors for successive cuboids in the spatio-temporal volume of the series of image sensor frames. The concatenators can be configured to concatenate the set of descriptor vectors to generate a joint descriptor vector. The fully connected neural network layer can be configured to generate a fully convolved descriptor vector from the joint descriptor vector. The cycle event probability module can be configured to generate probabilities of one or more of a cycle-start event, a cycle-continued event, a cycle-end event and a no-cycle event from the fully convolved vector. The max probability labeler can be configured to label a plurality of corresponding grid points with an associated maximum probability based on the received probabilities of the one or more of the cycle-start, cycle-continued, cycle-end and no-cycle events. The connected component analyzer can be configured to generate final start/continue/end or no cycle decisions based on supporting evidences from neighboring grid points.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
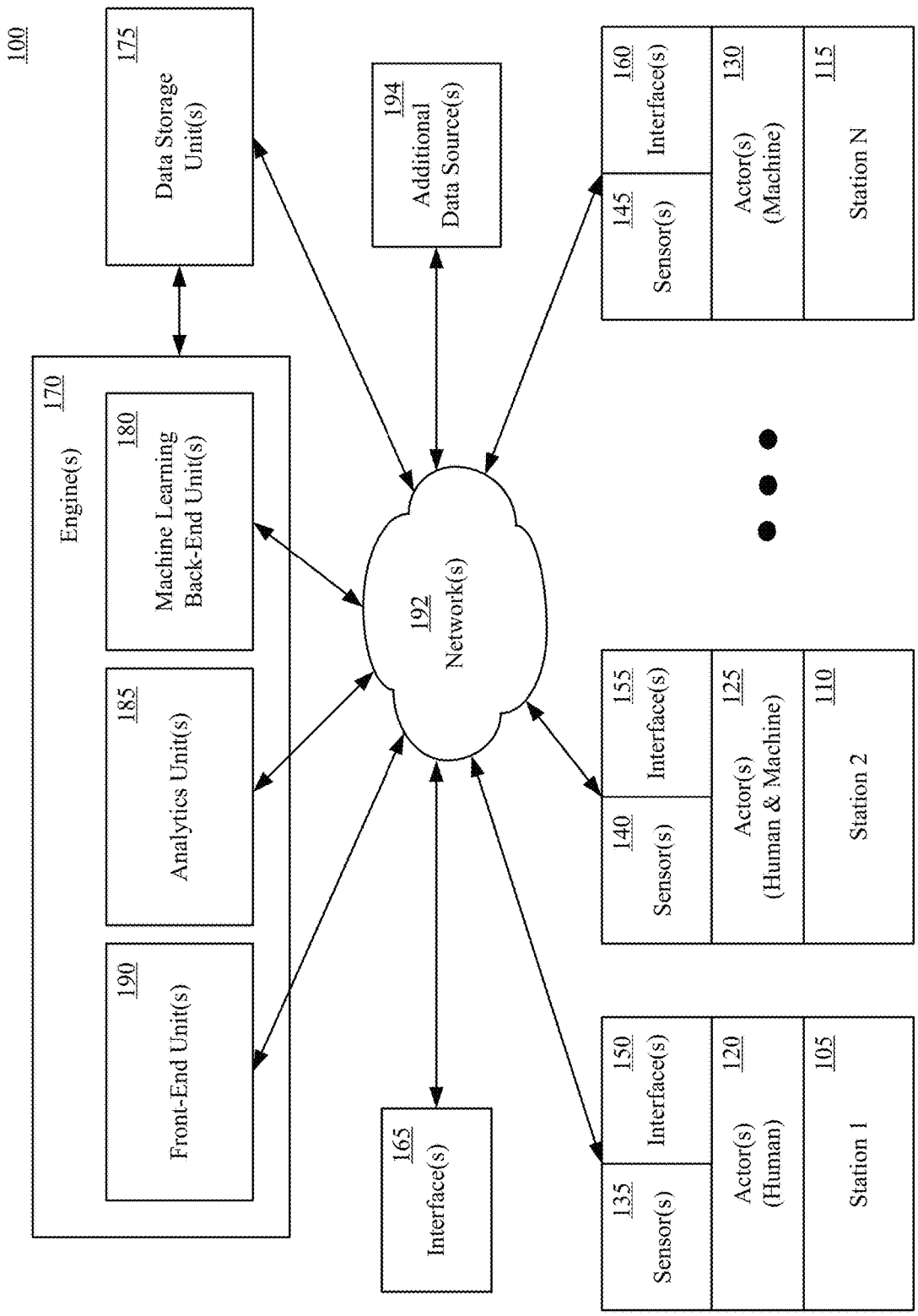
FIG. 1 shows a cycle recognition and analytics system, in accordance with aspect of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

As used herein the term process can include processes, procedures, transactions, routines, practices, and the like. As used herein the term sequence can include sequences, orders, arrangements, and the like. As used herein the term action can include actions, steps, tasks, activity, motion, movement, and the like. As used herein the term object can include objects, parts, components, items, elements, pieces, assemblies, sub-assemblies, and the like. As used herein a process can include a set of actions or one or more subsets of actions, arranged in one or more sequences, and performed on one or more objects by one or more actors. As used herein a cycle can include a set of processes or one or more subsets of processes performed in one or more sequences. As used herein a sensor stream can include a video sensor stream, thermal sensor stream, infrared sensor stream, hyperspectral sensor stream, audio sensor stream, depth data stream, and the like. As used herein frame based sensor stream can include any sensor stream that can be represented by a two or more dimensional array of data values. As used herein the term parameter can include parameters, attributes, or the like. As used herein the term indicator can include indicators, identifiers, labels, tags, states, attributes, values or the like. As used herein the term feedback can include feedback, commands, directions, alerts, alarms, instructions, orders, and the like. As used herein the term actor can include actors, workers, employees, operators, assemblers, contractors, associates, managers, users, entities, humans, cobots, robots, and the like as well as combinations of them. As used herein the term robot can include a machine, device, apparatus or the like, especially one programmable by a computer, capable of carrying out a series of actions automatically. The actions can be autonomous, semi-autonomous, assisted, or the like. As used herein the term cobot can include a robot intended to interact with humans in a shared workspace. As used herein the term package can include packages, packets, bundles, boxes, containers, cases, cartons, kits, and the like. As used herein, real time can include responses within a given latency, which can vary from sub-second to seconds.

Referring to FIG. 1 a cycle recognition and analytics system, in accordance with aspect of the present technology, is shown. The cycle recognition and analytics system 100 can be deployed in a manufacturing, health care, warehousing, shipping, retail, restaurant or similar context. A manufacturing context, for example, can include one or more stations 105-115 and one or more actors 120-130 disposed at the one or more stations. The actors can include humans, machines or any combination therefore. For example, individual or multiple workers can be deployed at one or more stations along a manufacturing assembly line. One or more robots can be deployed at other stations. A combination of one or more workers and/or one or more robots can be deployed at additional stations. It is to be noted that the one or more stations 105-115 and the one or more actors are not generally considered to be included in the cycle recognition and analytics system 100.

In a health care implementation, an operating room can comprise a single station implementation. A plurality of sensors, such as video cameras, thermal imaging sensors, depth sensors, or the like, can be disposed non-intrusively at various positions around the operating room. One or more additional sensors, such as audio, temperature, acceleration, torque, compression, tension, or the like sensors, can also be disposed non-intrusively at various positions around the operating room.

In a shipping implementation, the plurality of stations may represent different loading docks, conveyor belts, forklifts, sorting stations, holding areas, and the like. A plurality of sensors, such as video cameras, thermal imaging sensors, depth sensors, or the like, can be disposed non-intrusively at various positions around the loading docks, conveyor belts, forklifts, sorting stations, holding areas, and the like. One or more additional sensors, such as audio, temperature, acceleration, torque, compression, tension, or the like sensors, can also be disposed non-intrusively at various positions.

In a retailing implementation, the plurality of stations may represent one or more loading docks, one or more stock rooms, the store shelves, the point of sale stands (e.g. cashier stands, self-checkout stands and auto-payment geofence), and the like. A plurality of sensors such as video cameras, thermal imaging sensors, depth sensors, or the like, can be disposed non-intrusively at various positions around the loading docks, stock rooms, store shelves, point of sale stands and the like. One or more additional sensors, such as audio, acceleration, torque, compression, tension, or the like sensors, can also be disposed non-intrusively at various positions around the loading docks, stock rooms, store shelves, point of sale stands and the like.

In a warehousing or online retailing implementation, the plurality of stations may represent receiving areas, inventory storage, picking totes, conveyors, packing areas, shipping areas, and the like. A plurality of sensors, such as video cameras, thermal imaging sensors, depth sensors, or the like, can be disposed non-intrusively at various positions around the receiving areas, inventory storage, picking totes, conveyors, packing areas, and shipping areas. One or more additional sensors, such as audio, temperature, acceleration, torque, compression, tension, or the like sensors, can also be disposed non-intrusively at various positions.

Aspect of the present technology will be herein further described with reference to a manufacturing context so as to best explain the principles of the present technology without obscuring aspects of the present technology. However, the present technology as further described below can also be readily applied in health care, warehousing, shipping, retail, restaurants, and numerous other similar contexts.

The cycle recognition and analytics system 100 can include one or more interfaces 135-165. The one or more interfaces 135-165 can include one or more sensors 135-145 disposed at the one or more stations 105-115 and configured to capture streams of data concerning cycles, processes, actions, sequences, object, parameters and or the like by the one or more actors 120-130 and or at the one or more stations 105-115. The one or more sensors 135-145 can be disposed non-intrusively, so that minimal changes to the layout of the assembly line or the plant are required, at various positions around one or more of the stations 105-115. The same set of one or more sensors 135-145 can be disposed at each station 105-115, or different sets of one or more sensors 135-145 can be disposed at different stations 105-115. The sensors 135-145 can include one or more sensors such as video cameras, thermal imaging sensors, depth sensors, or the like. The one or more sensors 135-145 can also include one or more other sensors, such as audio, temperature, acceleration, torque, compression, tension, or the like sensors.

The one or more interfaces 135-165 can also include but not limited to one or more displays, touch screens, touch pads, keyboards, pointing devices, button, switches, control panels, actuators, indicator lights, speakers, Augmented Reality (AR) interfaces, Virtual Reality (VR) interfaces, desktop Personal Computers (PCs), laptop PCs, tablet PCs, smart phones, robot interfaces, cobot interfaces. The one or more interfaces 135-165 can be configured to receive inputs from one or more actors 120-130, one or more engines 170, or other entities. Similarly, the one or more interfaces 135-165 can be configured to output to one or more actors 120-130, one or more engine 170, or other entities. For example, the one or more front-end units 190 can output one or more graphical user interfaces to present indications of one or more cycle events, analytics concerning the one or more cycle events, and or the like on one or more interfaces 165, such displays at one or more stations 105-115, at management portals on tablet PCs, administrator portals as desktop PCs or the like. The one or more front-end units 190 can also receive responses, queries and or the like on a touch screen display device, keyboard, one or more buttons, microphone or the like from one or more actors. Accordingly, the interfaces 135-165 can implement an analysis interface and or the like of the one or more front-end units 190.

The cycle recognition and analytics system 100 can also include one or more engines 170 and one or more data storage units 175. The one or more interfaces 135-165, the one or more sensors 135-145, the one or more engines 170 and the one or more data storage units 175 can be coupled together by one or more networks 192. It is also to be noted that although the above described elements are described as separate elements, one or more elements of the action recognition and analytics system 100 can be combined together or further broken into different elements.

The one or more engines 170 can include one or more machine learning back-end units 180, one or more analytics units 185, and one or more front-end units 190. The one or more data storage units 175, the one or more machine learning back-end units 180, the one or more analytics units 185, and the one or more front-end units 190 can be implemented on a single computing device, a common set of computing devices, separate computing devices, or different sets of computing devices that can be distributed across the globe inside and outside an enterprise. Aspects of the one or more machine learning back-end units 180, the one or more analytics units 185 and the one or more front-end units 190, and or other computing units of the cycle recognition and analytics system 100 can be implemented by one or more central processing units (CPU), one or more graphics processing units (GPU), one or more tensor processing units (TPU), one or more digital signal processors (DSP), one or more microcontrollers, one or more field programmable gate arrays and or the like, and any combination thereof. In addition, the one or more data storage units 175, the one or more machine learning back-end units 180, the one or more analytics units 185, and the one or more front-end units 190 can be implemented locally to the one or more stations 105-115, remotely from the one or more stations 105-115, or any combination of locally and remotely. In one example, the one or more data storage units 175, the one or more machine learning back-end units 180, the one or more analytics units 185, and the one or more front-end units 190 can be implemented on a server local (e.g., on site at the manufacturer) to the one or more stations 105-115. In another example, the one or more machine learning back-end units 135, the one or more storage units 140 and analytics front-end units 145 can be implemented on a cloud computing service remote from the one or more stations 105-115. In yet another example, the one or more data storage units 175 and the one or more machine learning back-end units 180 can be implemented remotely on a server of a vendor, and one or more data storage units 175 and the one or more front-end units 190 can be implemented locally on a server or computer of the manufacturer. In other examples, the one or more sensors 135-145, the one or more machine learning back-end units 180, the one or more front-end unit 190, and other computing units of the cycle recognition and analytics system 100 can perform processing at the edge of the one or more networks 192 in an edge computing implementation. The above examples of the deployment of one or more computing devices to implement the one or more interfaces 135-165, the one or more engines 170, the one or more data storage units 175 and one or more additional data sources 194, are just some of the many different configurations for implementing the cycle recognition and analytics system 100. Any number of computing devices, deployed locally, remotely, at the edge or the like can be utilized for implementing the one or more interfaces 135-165, the one or more engines 170, the one or more data storage units 175, one or more additional data sources 194, or other computing units.

The cycle recognition and analytics system 100 can also optionally include one or more data compression units associated with one or more of the interfaces 135-165. The data compression units can be configured to compress or decompress data transmitted between the one or more interface 135-165, and the one or more engines 170. Data compression, for example, can advantageously allow the sensor data from the one or more interface 135-165 to be transmitted across one or more existing networks 192 of a manufacturer. The data compression units can also be integral to one or more interfaces 135-165 or implemented separately. For example, video capture sensors may include an integral Motion Picture Expert Group (MPEG) compression unit (e.g., H-264 encoder/decoder). In an exemplary implementation, the one or more data compression units can use differential coding and arithmetic encoding to obtain a 20× reduction in the size of depth data from depth sensors. The data from a video capture sensor can comprise roughly 30 GB of H.264 compressed data per camera, per day for a factory operation with three eight-hour shifts. The depth data can comprise roughly another 400 GB of uncompressed data per sensor, per day. The depth data can be compressed by an algorithm to approximately 20 GB per sensor, per day. Together, a set of a video sensor and a depth sensor can generate approximately 50 GB of compressed data per day. The compression can allow the cycle recognition and analytics system 100 to use a factory's network 192 to move and store data locally or remotely (e.g., cloud storage).

The cycle recognition and analytics system 100 can also be communicatively coupled to additional data sources 194, such as but not limited to a Manufacturing Execution Systems (MES), warehouse management system, or patient management system. The cycle recognition and analytics system 100 can receive additional data, including one or more additional sensor streams, from the additional data sources 194. The cycle recognition and analytics system 100 can also output data, sensor streams, analytic results and or the like to the additional data sources 194.

The cycle recognition and analytics system 100 can continually measure aspects of the real-world, making it possible to describe a context utilizing vastly more detailed data sets, and to solve important business problems like line balancing, ergonomics, and or the like. The data can also reflect variations over time. The one or more machine learning back-end units 170 can be configured to recognize, in real time, one or more cycles, processes, actions, sequences, objects, parameters and the like in the sensor streams received from the plurality of sensors 135-145. The one or more machine learning back-end units 170 can also be configured to also recognize, in real time, one or more processes, actions, sequences and the like in the sensor streams received from the plurality of sensors 135-145. The one or more machine learning back-end units 180 can recognize cycles, processes, actions, sequences, objects, parameters and the like in sensor streams utilizing deep learning, decision tree learning, inductive logic programming, clustering, reinforcement learning, Bayesian networks, and or the like.

Figure 2:
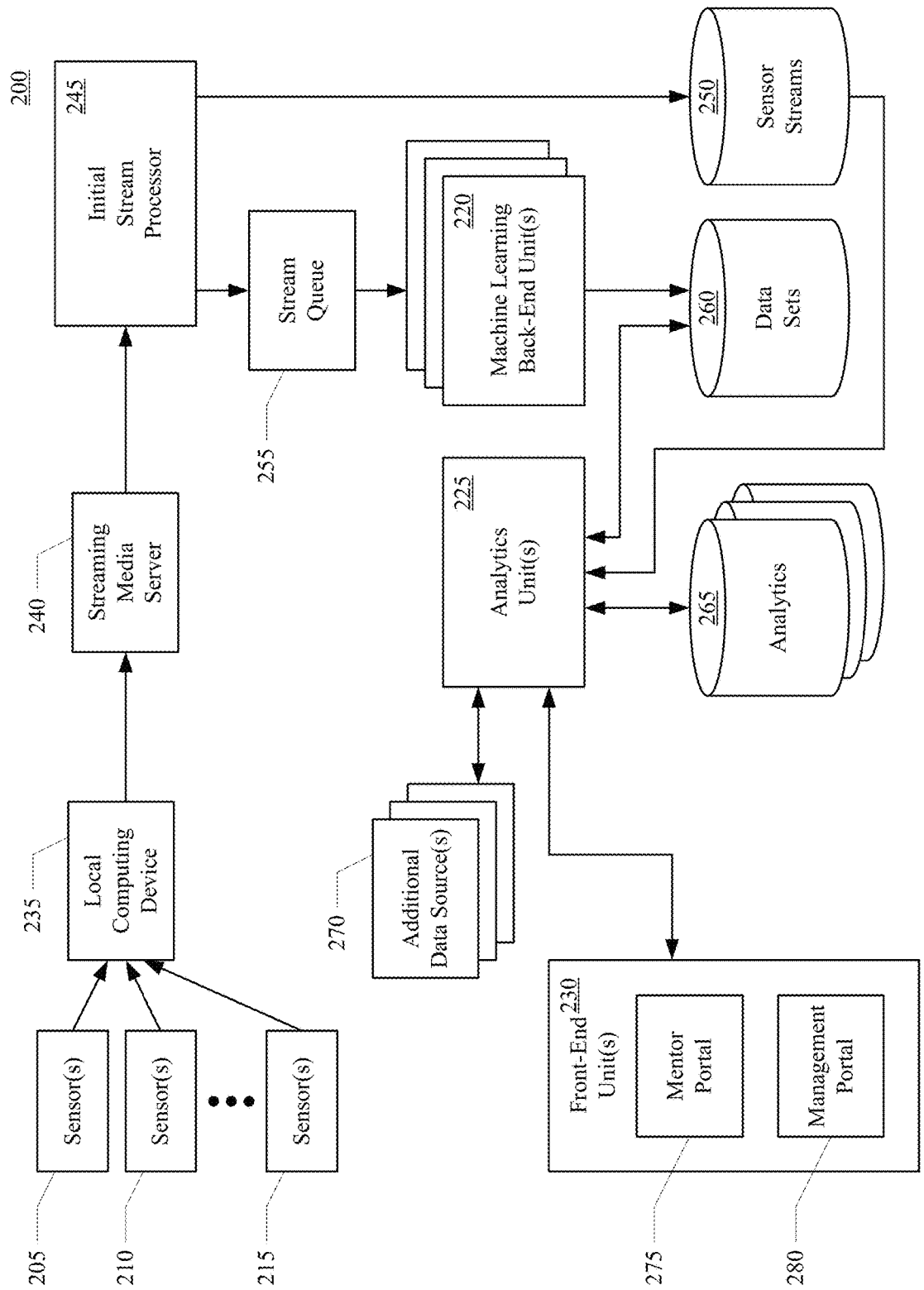
FIG. 2 shows a cycle recognition and analytics system, in accordance with aspect of the present technology.

Referring now to FIG. 2, another representation of a cycle recognition and analytics system, in accordance with aspect of the present technology, is shown. Again, the cycle recognition and analytics system 200 can be deployed in a manufacturing, health care, warehousing, shipping, retail, restaurant, or similar context. The analytics system 200 similarly includes one or more sensors 205-215 disposed at one or more stations, one or more machine learning back-end units 220, one or more analytics units 225, and one or more front-end units 230. The system can further include one or more additional subsystem, such as one or more local computing devices 235, one or more streaming media servers 240, one or more initial stream processors 245, one or more stream queues 255, one or more data storage units 250, 260, 265, one or more additional data sources 270, and or the like. The one or more sensors 205-215 can be coupled to one or more local computing devices 235 configured to aggregate the sensor data streams from the one or more sensors 205-215 for transmission across one or more communication links to a streaming media server 240. The streaming media server 240 can be configured to received one or more streams of sensor data from the one or more sensors 205-215. An initial stream processor 245 can be coupled to the streaming media server 240 to receive the one or more sensor data streams and convert the sensor data from one format to another. For example, the one or more sensors may generate Motion Picture Expert Group (MPEG) formatted (e.g., H.264) video sensor data, and the initial stream processor 245 can be configured to extract frames of JPEG sensor data. The initial stream processor 245 can also be configured to segment the sensor data into pre-determined chucks, subdivide the chunks into key frame aligned segments, and create per segment sensor data in one or more formats. For example, the initial stream processor 245 can divide the sensor data into five minute chunks, subdivide the chunks into key frame aligned segments, and convert the key frame aligned segments into MPEG, MPEG Dynamic Adaptive Streaming over Hypertext Transfer Protocol (DASH) format, and or the like. The initial stream processor 245 can be configured to store the sensor stream segments in one or more data structures for storing sensor streams 250. In one implementation, as sensor stream segments are received, each new segment can be appended to the previous sensor stream segments stored in the one or more data structures for storing sensor streams 250.

A stream queue 255 can also be coupled to the initial stream processor 245. The stream queue 255 can be configured to buffer the sensor data from the initial stream processor 245 for processing by the one or more machine learning back-end units 220. The one or more machine learning back-end units 220 can be configured to recognize, in real time, one or more cycles, objects, parameters and the like in the sensor streams received from the plurality of sensors 205-215. The one or more machine learning back-end units 220 can also be configured to recognize processes, actions, sequences and or the like in the sensor streams.

In one implementation, the one or more machine learning back-end units 220 can recognize cycles, objects, parameters and the like in sensor streams utilizing deep learning, decision tree learning, inductive logic programming, clustering, reinforcement learning, Bayesian networks, and or the like. The one or more machine learning back-end units 220 can be configured to generate indicators of the one or more cycles, objects, parameters and or the like. The indicators can include descriptions, identifiers, values and or the like associated with the cycles, objects, parameters and or the like. The parameters can include, but are not limited to, time, duration, sensor identifiers, station identifiers, and or the like. The one or more machine learning back-end units 220 can be configured to store one or more data sets including the indicators of the one or more cycles, one or more objects, and one or more parameters for each cycle. The data sets can be stored in one or more data structures for storing the data sets 260. The indicators of the one or more cycles one or more objects, and one or more parameters in the data sets can be indexed to corresponding portion of the sensor streams in one or more data structures for storing sensor streams 250. In one implementation, the one or more streams of sensor data and the indicators of the one or more cycles, one or more objects and one or more parameters indexed to corresponding portion of the one or more streams of sensor data can be encrypted when stored to protect the integrity of the streams of sensor data and or the data sets. In one implementation, the one or more streams of sensor data and the indicators of the one or more cycles, one or more objects and one or more parameters indexed to corresponding portion of the one or more streams of sensor data can be stored utilizing blockchaining. The blockchaining can be applied across the cycles, sensor streams, stations, supply chain and or the like. The blockchaining can include calculating a cryptographic hash based on blocks of the data sets and or blocks of the streams of sensor data. The data sets, streams of sensor data and the cryptographic hash can be stored in one or more data structures in a distributed network.

The one or more analytics units 225 can be coupled to the one or more data structures for storing the sensor streams 250, one or more data structures for storing the data sets 260, one or more data structures for storing analytics 265, and one or more additional sources of data 270. The one or more analytics units 225 can be configured to perform statistical analysis on determined cycle events, object and parameter data in one or more data sets. The one or more analytics units 225 can also utilize additional data received from one or more additional data sources 270. The additional data sources 270 can include, but are not limited to, Manufacturing Execution Systems (MES), warehouse management system, or patient management system, accounting systems, robot datasheets, human resource records, bill of materials, and sales systems. Some examples of data that can be received from the additional data sources 270 can include, but are not limited to, time, date, shift, day of week, plant, factory, assembly line, sub-assembly line, building, room, supplier, work space, action capability, energy consumption, and ownership cost. The one or more analytics units 225 can be configured to utilize the additional data from one or more additional sources of data 270 to update, correct, extend, augment or the like, the data about the cycles, objects, parameters and or the like in the data sets. Similarly, the additional data can also be utilized to update, correct, extend, augment or the like, the analytics generate by the one or more analytics units 225. The one or more analytics units 225 can also store trends and other comparative analytics utilizing the data sets and or the additional data, can use sensor fusion to merge data from multiple sensors, and other similar processing, and store the results in the one or more data structures for storing analytics 265.

The one or more analytics units 225 can also be coupled to one or more front-end units 230. The one or more front-end units 230 can include a mentor portal 275, a management portal 280, and other similar portals. The mentor portal 275 can be configured for presenting feedback generated by the one or more analytics units 225 and or the one or more front-end units 230 to one or more actors. For example, current cycle time, a current average cycle time and or the like can be displayed to the work at a given station to provide real time feedback to the worker. A target cycle time can also be displayed to the worker so that the worker can see their performance. The management portal 280 can be configured to enable searching of the one or more data structures storing analytics, data sets and sensor streams. The management portal 280 can also be utilized to control operation of the one or more analytics units 225 for determining cycle events, generating training content, creating work charts, performing line balancing analysis, assessing ergonomics, creating job assignments, performing causal analysis, automation analysis, presenting aggregated statistics, and the like. For example, the management portal 280 can be utilized to obtain reports of mean cycle time, median cycle time, standard deviation of cycle time for a given station, a given worker, for a given shift, a given date or range of dates, across a set of stations, from a given product configuration, and or the like that can be utilized to track worker performance, predict how long it takes to satisfy a given order, and or the like.

The cycle recognition and analytics system 200 can non-intrusively digitize cycle events, objects, parameters and the like performed by numerous entities, including both humans and machines, using machine learning. The cycle recognition and analytics system 200 enables human activity to be measured automatically, continuously and at scale. By digitizing the cycle events, objects, parameters, and the like, the action recognition and analytics system 200 can be utilized to optimize manual and/or automatic processes.

Figure 3:
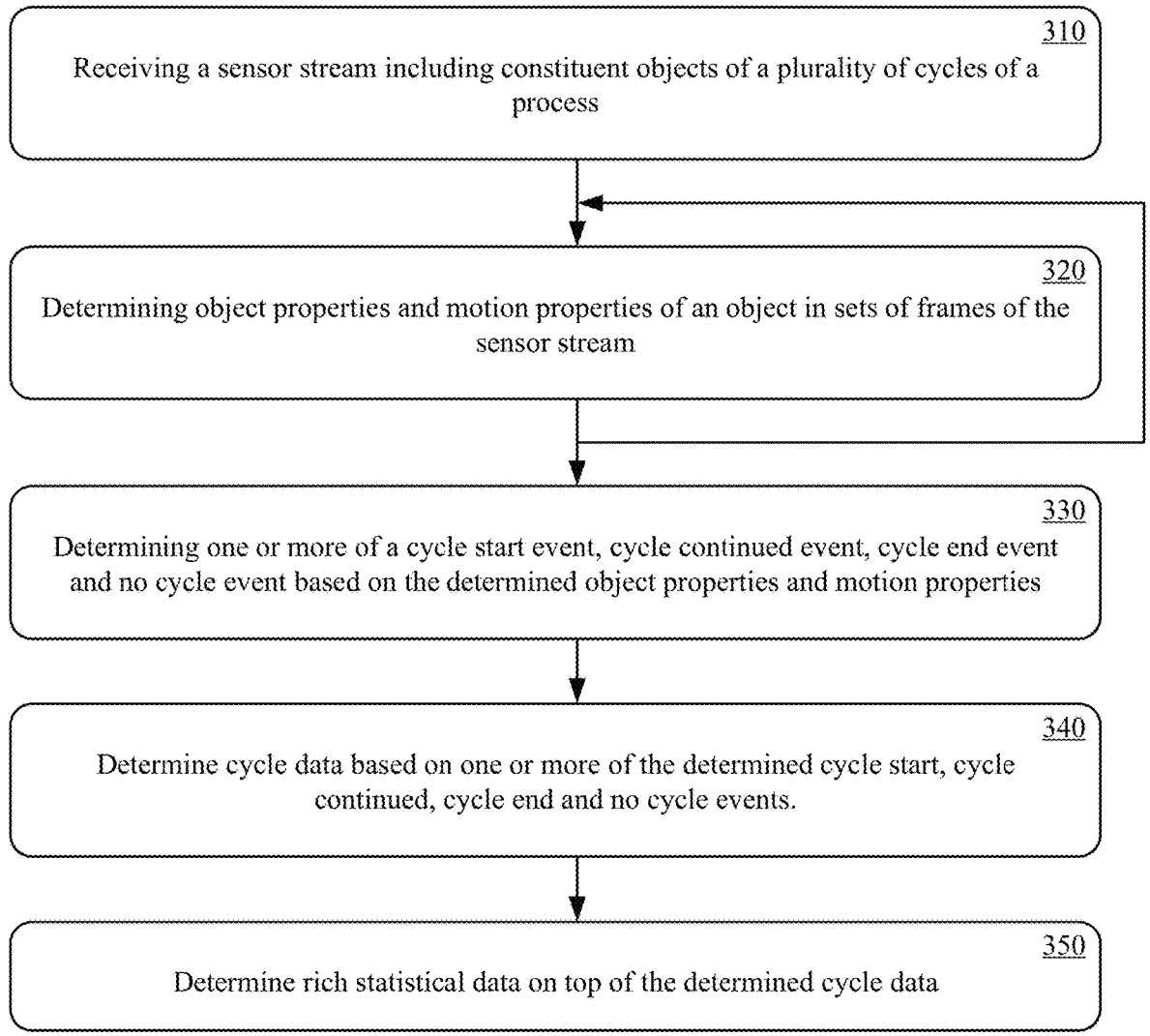
FIG. 3 shows a method of detecting cycles of a process, in accordance with aspects of the present technology.
Figure 4:
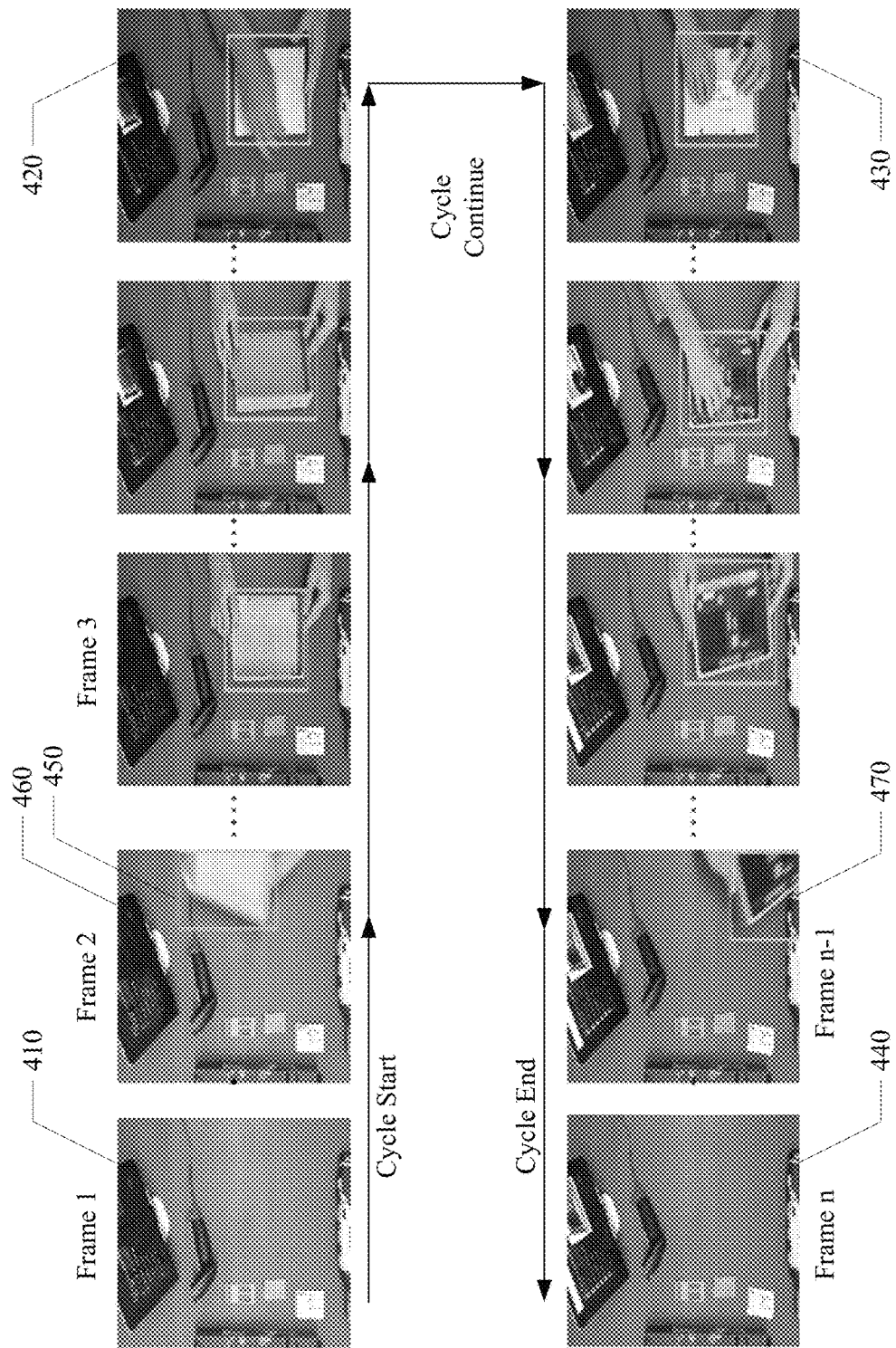
FIG. 4 illustrates an exemplary set of sensor frames, in accordance with aspects of the present technology.

Referring now to FIG. 3, a method of detecting cycles of a process, in accordance with aspects of the present technology, is shown. The method of detecting cycles of a process will be further explained herein with reference to FIG. 4, which illustrates an exemplary set of sensor frames captured at an exemplary station. The method can include receiving a sensor stream including constituent objects of a plurality of cycles of the process, at 310. In one implementation, the sensor stream can include approximately 24, 30, 60 or 120 video frames per second. The frames can have a resolution of 640×360 pixels, or other similar low-resolution format. For example, a stream of frames from 1 to n, including constituent objects of a given cycle, can be received. In the illustrated set of sensor frames, the sequence of frames start with the left top frame 410, proceeds in sequence along the top to the top right frame 420 and then from the bottom right frame 430 to the bottom left frame 440.

At 320, object properties and motion properties of an object can be determined from sets of frames of the sensor stream. A given object, such as a laptop computer, can be detected along with the motion of the given object between sequential frames. In the example illustrated in FIG. 4, the detected object can be outlined with a green rectangle 450 whenever visible in a frame. As illustrated, the computer can first be detected toward the right portion of frame 2 460, and moves toward the center of the frame in subsequent frames, before moving toward the bottom right side of the frame before it leaves in frame n−1 470. In the green rectangle, the detected object is subject to variances in pose, look, position, lighting and the like. For example, the computer may be partly occluded in one or more frames 420, 430 by the worker. Similarly, the top of the laptop may be detected in some of the frames, while the bottom of the laptop is detected on other frames. The object properties and motion properties can be iteratively performed for each frame of the received sensor stream.

At 330, cycle-start, cycle-continued, cycle-end and or no-cycle events can be determined based on the determined object properties and the motion properties. For example, the situation where the assembly unit is not detected in Frame 1 410 can be representative of a no-cycle event. In the second frame 460, the unit, a computer case, enters the camera's view. The change from no object in frame 1 410 to the presence of the object in frame 2 460 can be representative of a cycle-start event. Detection of the object in sequential frames can be indicative of a cycle-continue event. The change from the presence of the object in frame n−1 470 to the absence of the object in frame n 440 can be indicative of a cycle-end event. The combined use of object properties and motion properties increase the probability of correctly detecting the cycle-start, cycle-continued, cycle-end and or no-cycle events. For instance, if it is determined that the object is at a certain position in one frame, it can be determined that a cycle has continued if a low confidence recognition of the object is detected in the next frame at a reasonably close location to the determined position of the object in the one frame.

The determined object properties and motion properties can be utilized to determine no unit detected frames and unit detected frames. The transition from a no unit detected frame to a unit detected frame can be identified as a cycle-start event, and the transition from the unit detected frame to a no unit detected frame can be identified as a cycle-end event. If a unit is detected in a set of sequential frames, the frames can be referred to as cycle-continue events. If a unit is not detected in a set of sequential frame, the frames can be identified as no-cycle events.

In one embodiment, object properties and motion properties can be determined for a set of three image frames, a previous image frame, a current image frame and a next image frame. The object properties and motion properties can be utilized to determine if a given object is present or absent in each frame. A cycle-start event can be determined if the given object is absent in the previous frame and the current frame, and the given object is present in the next frame. A cycle-continue event can be determined if the given object is present in the previous, the current and the next frames. A cycle-end event can be determined if the given object is present in the previous frame and the current frame, and is absent in the next frame. A no-cycle event can be determined if the given object is absent in the previous, current and next frames.

At 340, cycle data can be determined from one or more of the determined cycle-start, cycle-continue, cycle-end and/or no-cycle events, at 340. From the cycle-start, cycle-end, cycle-continue and or no-cycle events, cycle data can be determined. Rich statistical data can then be generated on top of identified cycle data, at 350. The statistical data can include mean duration of the cycles, the standard deviation of the cycles, and the like, for individual or groups of stations, for individual or group of workers, for the assembly line, for the factory, for a collection of manufacturing plants in a specific country, and the like.

Figure 5A:
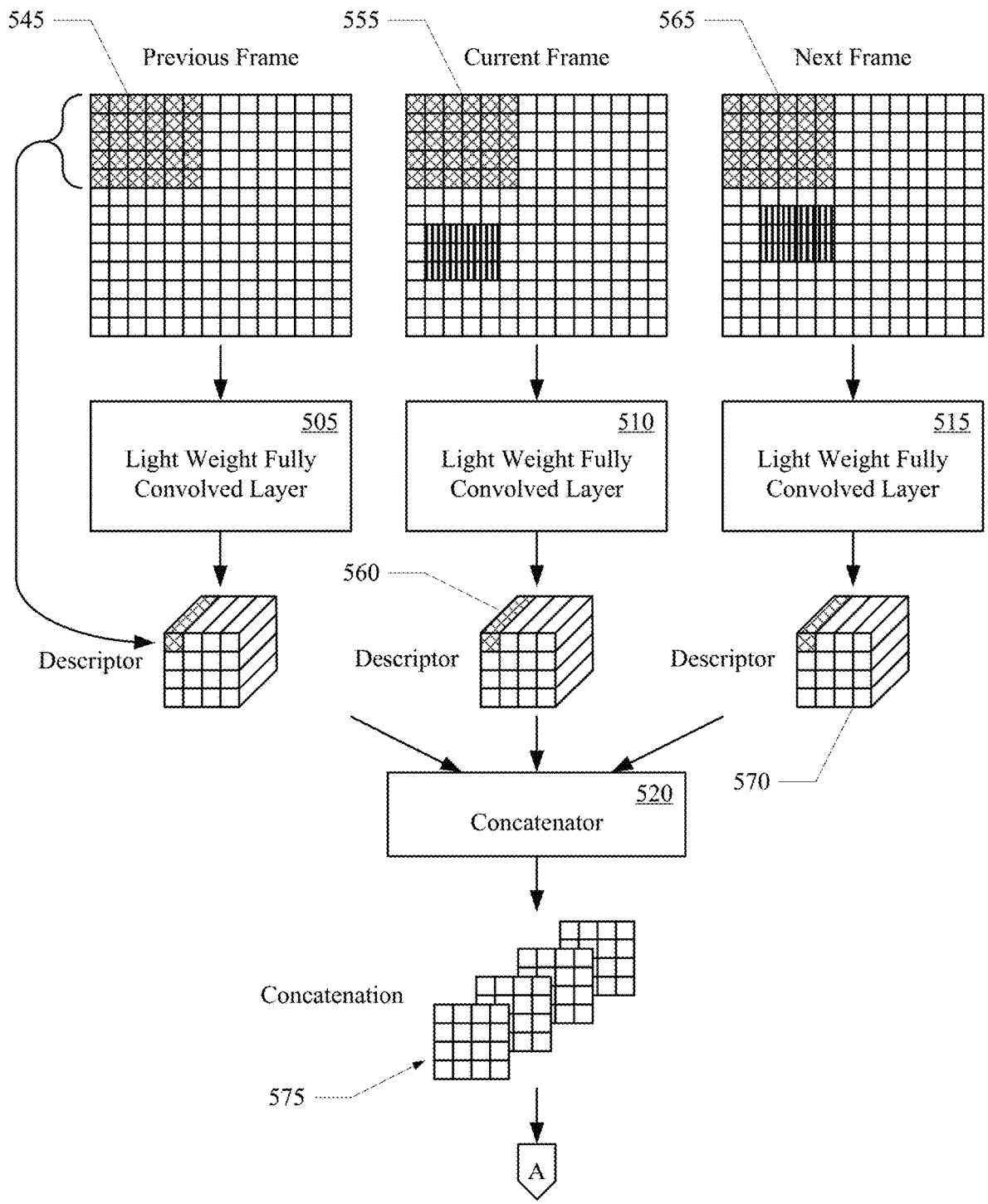
FIGS. 5A and 5B show a cycle detection system, in accordance with aspects of the present technology.
Figure 5B:
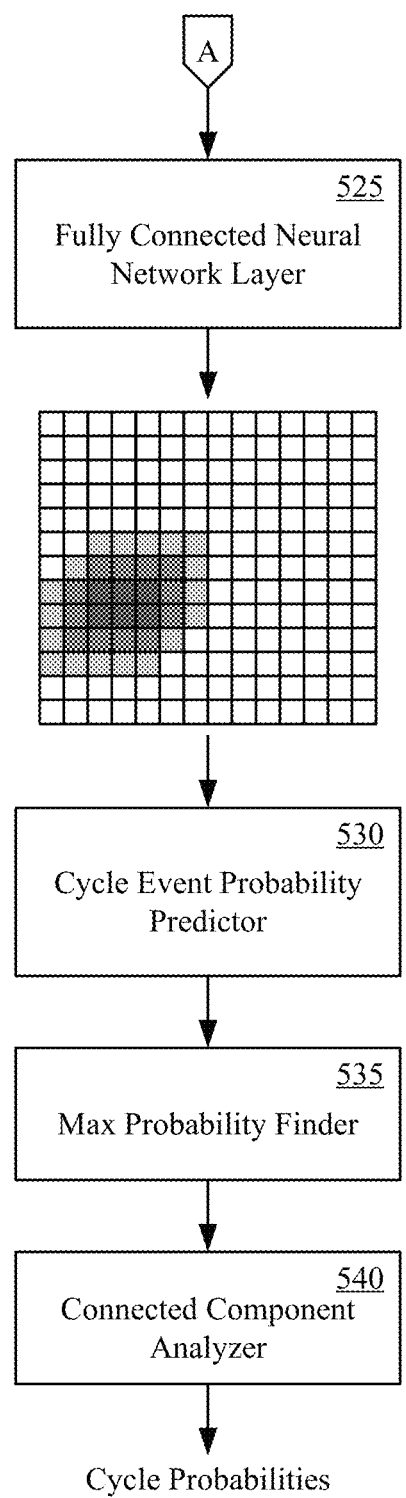
Figure 6A:
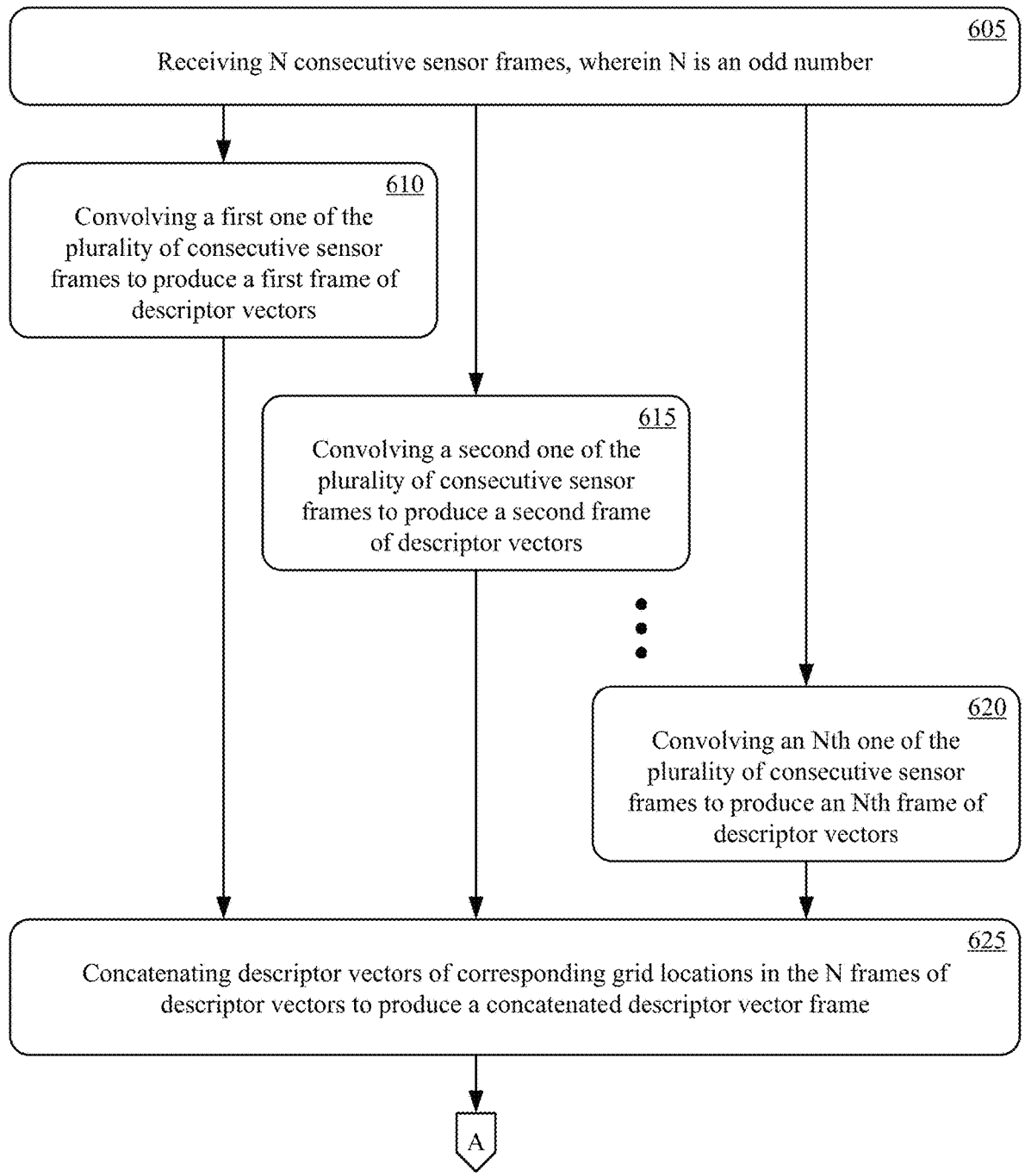
FIGS. 6A and 6B show a cycle detection method, in accordance with aspects of the present technology.
Figure 6B:
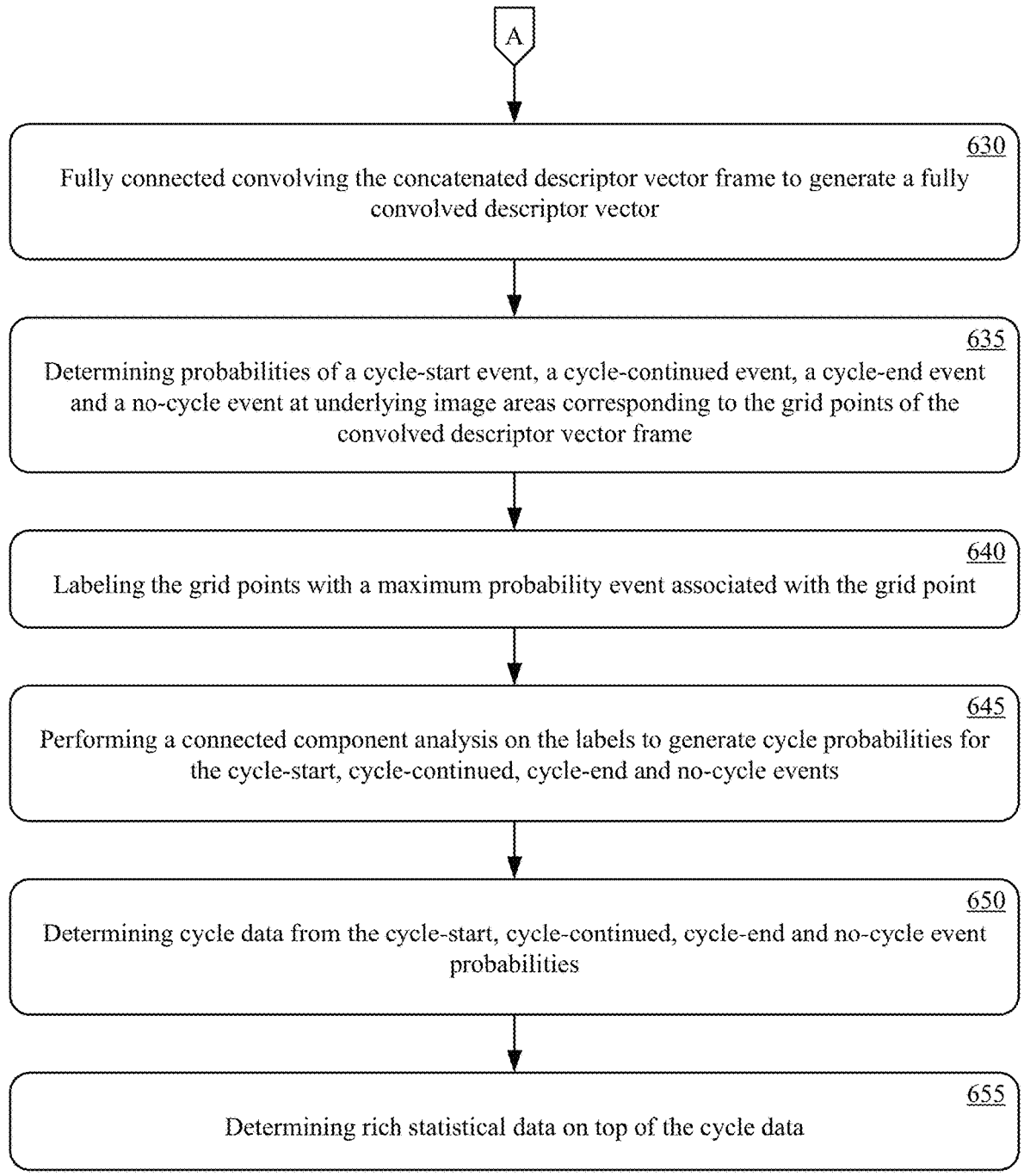

Referring now to FIGS. 5A and 5B, a cycle detection system, in accordance with aspects of the present technology, is shown. The cycle detection system will be further described with reference to FIGS. 6A and 6B, which show a cycle detection method, in accordance with aspects of the present technology. The cycle detection system 500 can include a set of light weight fully convolved layers 505-515, a concatenator 520, a fully connected neural network layer 525, a cycle event probability predictor module 530, a maximum probability finder 535, and a connected component analyzer 540. The set of light weight fully convolved layers 505-515 can be configured to receive a corresponding one of a set of sensor frames at 605, and generate respective descriptor vectors, at 610-620. The set of sensor frames can be N consecutive sensor frames, wherein N is an odd number. In one implementation, the N consecutive sensor frames can include a previous frame, a current frame and a next frame. The frames can be relatively high resolution. For examples, the frames can be 640×360 grid points. In one implementation, the light weight convolution layers can include five (5) convolution layers. The last convolution layer can produce a two-dimensional (2D) grid roughly $2^L$ time smaller in size than the input image, where L is the number of max-pooling layers in the network. In one implementation, the number of max-pooling layers can be five (5). The descriptor vectors can be a digest, or sometimes also referred to as an embedding, for a corresponding patch of the input image. The set of fully convolved neural network layers can generate a descriptor for each of a plurality of regions of the sensor frame. In one implementation, a first light weight fully convolved layer 505 can be configured to convolve the previous one of the consecutive sensor frames 545 to produce a first frame of descriptor vectors 550, a second light weight fully convolved layer 510 can be configured to convolve the current one of the consecutive sensor frames 555 to produce a second frame of descriptor vectors 560, and a third light weight fully convolved layer 515 can be configured to convolve the next one of the consecutive sensor frames 565 to produce a third frame of descriptor vectors 570. The set of light weight fully convolved layers can be trained to detect if at least a portion of a given object is present in a region.

At 625, the concatenator 520 can be configured to receive the descriptor vectors 550, 560, 570 of the set of sensor frames and generate a joint descriptor vector 575. The corresponding grid location of the descriptor vectors of the previous, current and next sensor frames can be concatenated to generate the joint descriptor vector. The joint descriptor vector can represent the look and motion of the images. The joint descriptor vector encodes the looks of a specific portion of the image across the set of sensor frames. If in any frame an object to be detected overlaps that portion, the joint descriptor vector describes the overlapping part of the object. Otherwise, the joint descriptor vector describes the background. If the object is absent at the corresponding image portion in one frame and present in one or more of the other frames, representing motion, there will be a substantial difference among the descriptor vectors. The difference among the descriptor vectors is encoded in the joint descriptor vector.

At 630, the fully connected neural network layer 525 can be configured to receive the joint descriptor vector and generate a fully convolved descriptor vector. In the fully connected neural network layer 525, every input in one layer is connected to every input of another layer.

At 635, the cycle event probability predictor module 530 can be configured to receive the fully convolved descriptor vector and generate probabilities of a cycle-start event, a cycle-continued event, a cycle-end event and a no-cycle event at the underlying image area corresponding to each grid point.

At 640, the maximum probability finder 535 can be configured to receive the cycle-start event, a cycle-continued event, a cycle-end event and a no-cycle event probabilities and label each grid point with the associated maximum probability.

At 645, the connected component analyzer 540 can be configured to receive the maximum probabilities and generate cycle probabilities for the cycle-start, cycle-continued, cycle-end and no-cycle events. The connected component analysis module can perform a connected component analysis on the maximum probability labels. The connected component analysis can gather evidence from neighboring grid points to support a decision at each grid point. Multiple connected components indicate multiple instance of the object to be detected, which indicates multiple overlapping cycles.

At 650, the cycle-start, cycle continued, cycle-end and no-cycle event probabilities can be utilized to generate cycle data such as cycle start time, cycle end time, cycle duration time, and or the like. In addition, statistical data can be generated on top of the cycle data, at 655. The statistical data can include the mean duration of the cycles, the standard deviation of the cycles, and the like, for individual or groups of stations, for individual or group of workers, for the assembly line, for the factory, for a collection of manufacturing plants in a specific country, and the like.

Accordingly, object properties and motion cues can be analyzed in real time to automatically arrive at cycle-start, cycle-continue, cycle-end and no-cycle decision from which rich statistical data, in manufacturing, health care, warehousing, shipping, retail, restaurant or similar contexts, can be determined. The cycle detection techniques in accordance with aspects of the present technology has shown a 4× reduction in cost and a 7% improvement in accuracy, measured as f-score vis a via human curated results, as compared to determining cycle data based on detecting the constituent objects in a sensor stream.

Figure 7:
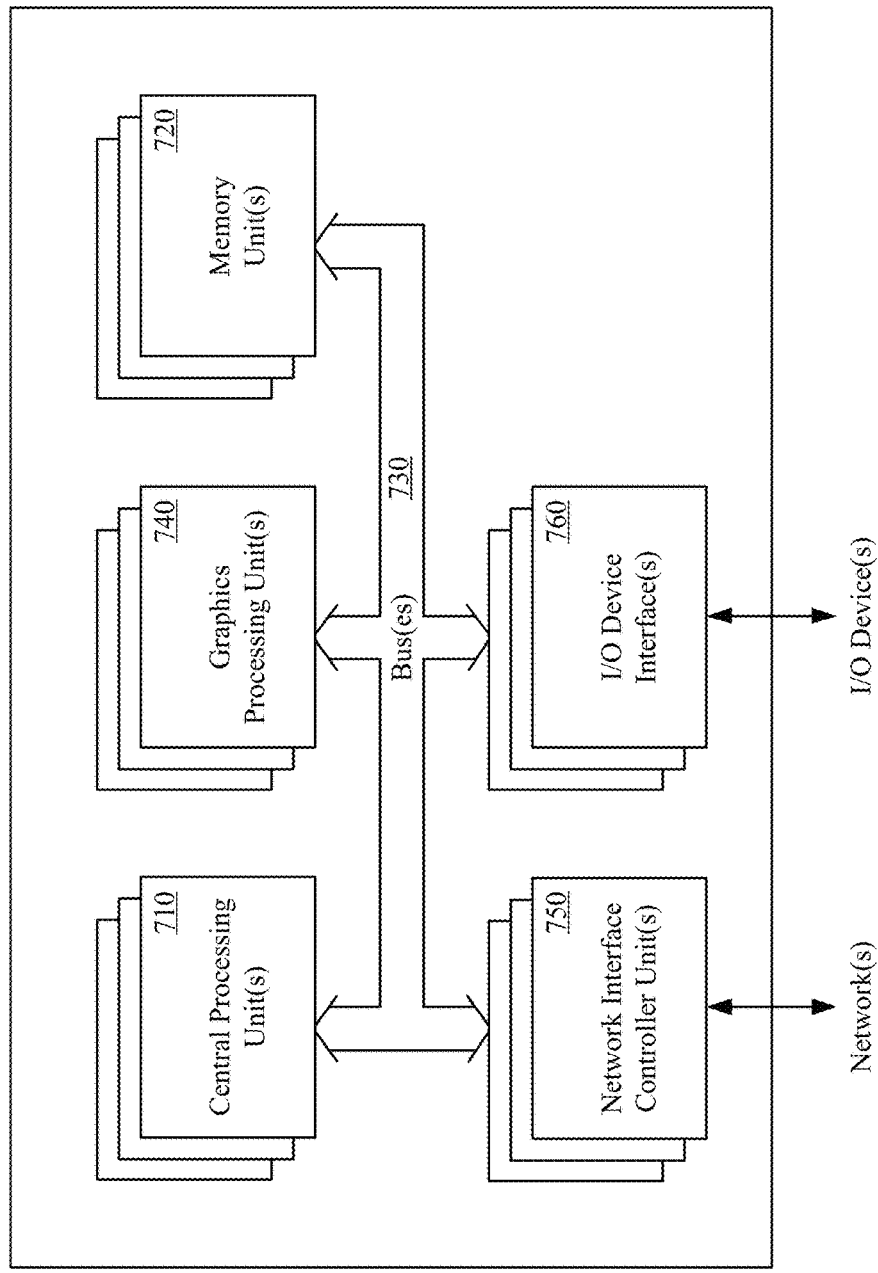
FIG. 7 illustrates an exemplary computing device upon which various aspects of the present technology can be implemented.

Referring now to FIG. 7, a block diagram of an exemplary computing device upon which various aspects of the present technology can be implemented. In various embodiments, the computer system 700 may include a cloud-based computer system, a local computer system, or a hybrid computer system that includes both local and remote devices. In a basic configuration, the system 700 includes at least one processing unit 710 and memory 720 communicatively coupled by one or more buses 730. The system 700 may also have additional features and/or functionality. For example, the system 700 may include one or more Graphics Processing Units (GPUs) 740. Additionally, the system 700 may also include additional storage (e.g., removable and/or non-removable) including, but not limited to, magnetic or optical disks or tape.

The system 700 may also contain network interface controller units 750 that allow the device to communicate with other devices, e.g., in a networked environment using logical connections to one or more remote computers. Furthermore, the system 700 may also include one or more input/output (I/O) devices 760 such as, but not limited to, a voice input device, touch input device, keyboard, mouse, pen, touch input display device, a display device, speakers, printer, and or the like.

In the example of FIG. 7, the memory 720 includes computer-readable instructions, data structures, program modules, and the like associated with one or more various embodiments of the present technology. However, the embodiment(s) may instead reside in any one of the computer storage media used by the system 700, or may be distributed over some combination of the computer storage media, or may be distributed over some combination of networked computers, but is not limited to such.

It is noted that the computing system 700 may not include all of the elements illustrated by FIG. 7. Moreover, the computing system 700 can be implemented to include one or more elements not illustrated by FIG. 7. It is pointed out that the computing system 700 can be utilized or implemented in any manner similar to that described and/or shown by the present disclosure, but is not limited to such.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A cycle detection system comprising:
   a first light weight fully convolved layer configured to receive a previous frame and generate a first frame of descriptor vectors;
   a second light weight fully convolved layer configured to receive a current frame and generate a second frame of descriptor vectors;
   a third light weight fully convolved layer configured to receive a next frame and generate a third frame of descriptor vectors;
   a concatenator configured to concatenate the first, second and third frames of descriptor vectors to generate a joint descriptor vector;
   a fully connected neural network layer configured to receive the joint descriptor vector and generate a fully convolved descriptor vector;
   a cycle event probability predictor module configured to receive the fully convolved descriptor vector and generate a probability of one or more of a cycle-start event, a cycle-continue event, a cycle-end event and a no-cycle event;
   a max probability finder configured to receive the probabilities of the one or more of the cycle-start event, the cycle-continue event, the cycle-end event and the no-cycle event and label a plurality of corresponding grid points with an associated maximum probability; and a connected component analyzer configured to receive the maximum probabilities of the corresponding grid points and generate cycle probabilities for one or more of the cycle-start, cycle-continue, cycle-end and no-cycle events.

2. The cycle detection system of claim 1, wherein the joint descriptor vector represents a look and motion of an object in an image.

3. The cycle detection system of claim 1, wherein the first, second and third light weight fully convolved layers are configured to detect if at least a portion of a given object is present in a region of an image.

4. The cycle detection system of claim 1, wherein the first, second and third light weight fully convolved layers include five convolution layers.

5. The cycle detection system of claim 4, wherein the first, second and third light weight fully convolved layers produce a two-dimensional (2D) grid approximately $2^L$ time smaller in size than an input image of the first, second and third frames of descriptor vectors, where L is a number of max-pooling layers in first, second and third light weight fully convolved networks.

6. The cycle detection system of claim 5, wherein the first, second and third light weight fully convolved layers includes five max-pooling layers.

7. A cycle detection method comprising:

generating a set of frame descriptor vectors for a corresponding set of sequential image frames;

concatenating the set of frame descriptor vectors to generate a joint descriptor vector;

generating a fully convolved descriptor vector from the joint descriptor vector;

generating probabilities of one or more of a cycle-start event, a cycle-continue event, a cycle-end event and a no-cycle event based on the fully convolved descriptor vector;

labeling a plurality of grid points with a maximum probability of one or more of the cycle-start event, a cycle-continue event, a cycle-end event and a no-cycle event probabilities;

performing a connected component analysis to determine cycle probabilities for one or more of the cycle-start event, a cycle-continue event, a cycle-end event and a no-cycle event; and generating cycle data based on the determined cycle probabilities for one or more of the cycle-start event, a cycle-continue event, a cycle-end event and a no-cycle event.

8. The cycle detection method according to claim 7, further comprising:

generating statistical data from the cycle data.

9. The cycle detection method according to claim 7, wherein the sequential image frames have a resolution of 640 pixels by 360 pixels.

10. The cycle detection method according to claim 9, wherein a size of the frame descriptor vectors is 512.

* * * * *